United States Patent [19]

Singer et al.

[11] 4,281,424
[45] Aug. 4, 1981

[54] BED FRAME

[75] Inventors: Richard A. Singer, Oak Brook; Gerry D. Welton, Morton, both of Ill.

[73] Assignee: Berkshire Furniture Co., Inc., Chicago, Ill.

[21] Appl. No.: 96,664

[22] Filed: Nov. 23, 1979

[51] Int. Cl.³ .............................................. A47C 19/00
[52] U.S. Cl. ...................................... 5/282 R; 5/207; 5/288; 5/310; 403/257
[58] Field of Search .................. 5/207, 282, 288, 301, 5/310; 403/187, 190, 191, 194, 247, 248, 256, 257, 258

[56] References Cited

U.S. PATENT DOCUMENTS

| 1,070,079 | 8/1913 | Thomas | 5/301 |
| 2,618,000 | 11/1952 | Harris | 5/207 |
| 3,427,056 | 2/1969 | Cunningham | 403/258 |
| 3,787,134 | 1/1974 | Burr | 403/256 |
| 3,867,045 | 2/1975 | Beals | 403/190 |
| 4,013,371 | 3/1977 | Nagase | 403/187 |
| 4,038,710 | 8/1977 | Tamboscio | 5/310 |
| 4,196,484 | 4/1980 | Harris | 5/282 R |

FOREIGN PATENT DOCUMENTS 782764 9/1957 United Kingdom .................. 5/282 R Primary Examiner—Casmir A. Nunberg
Attorney, Agent, or Firm—Hill, Van Santen, Steadman, Chiara & Simpson

[57] ABSTRACT

A bed frame has a pair of tubular side members joined by a pair of laterally extending tubular cross members. Attached to each end of a tubular side member is a clamp formed from sheet stock. Each pair of clamps rigidly joins a headboard or a footboard to the frame. A set of tubular feet extends perpendicularly downward from the lateral cross members.

2 Claims, 18 Drawing Figures

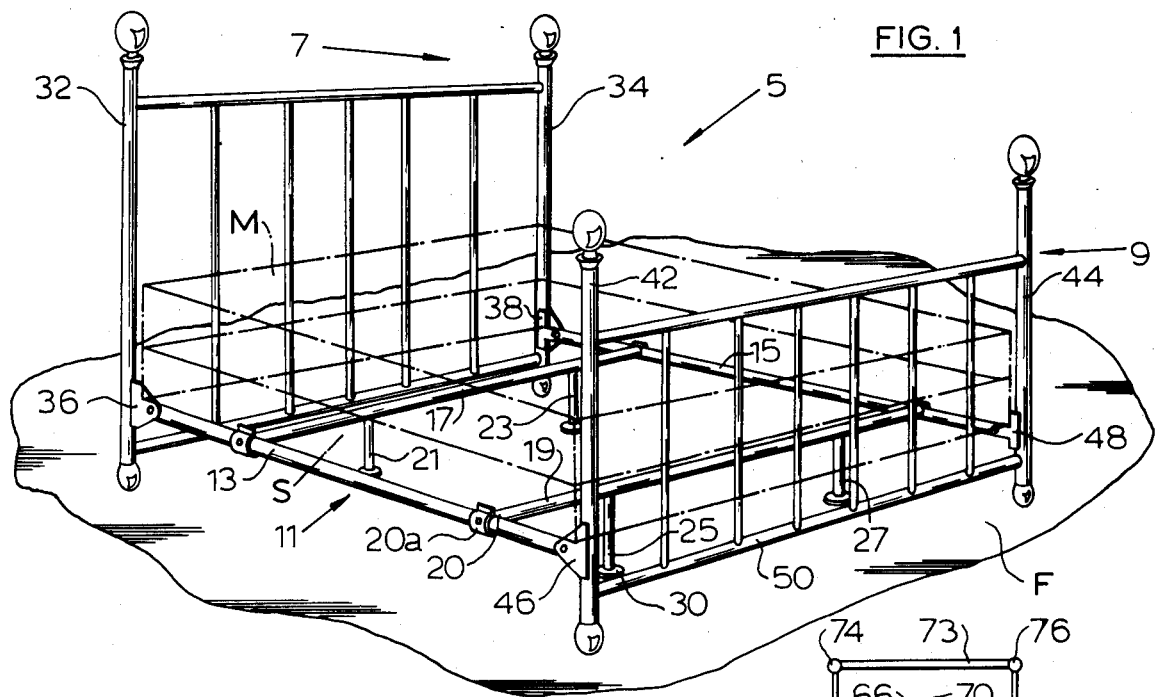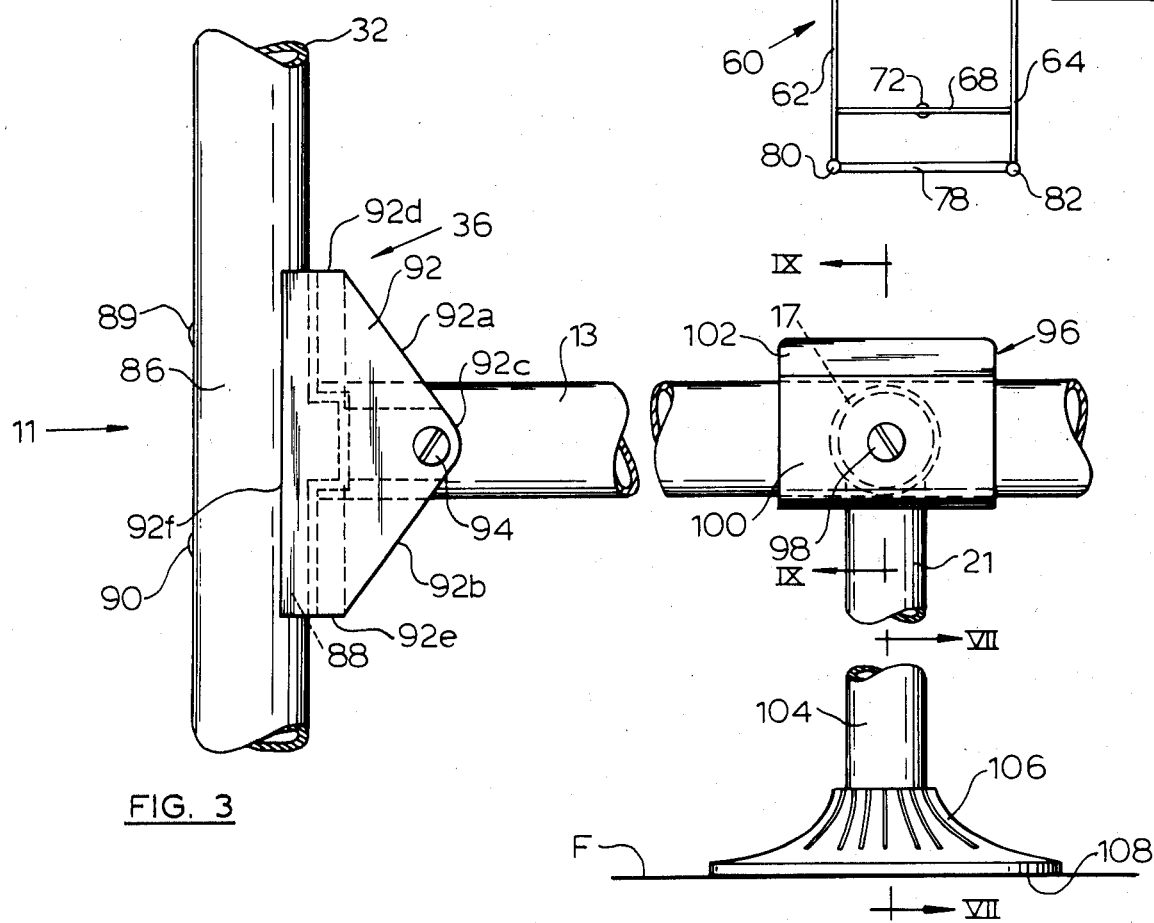

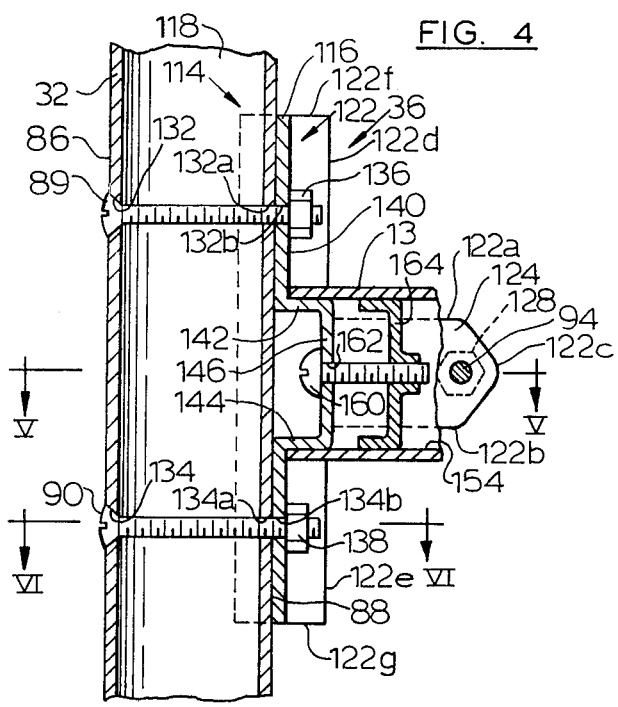
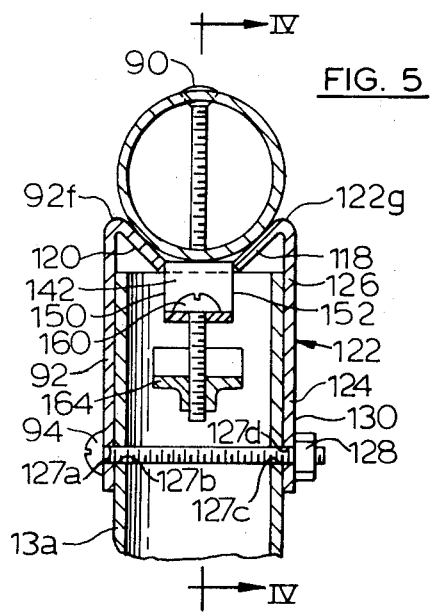
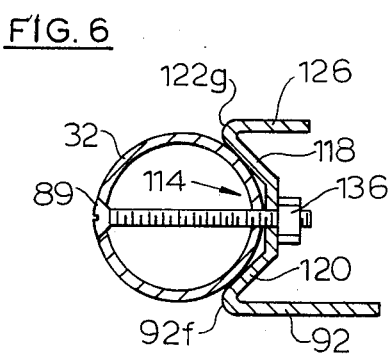
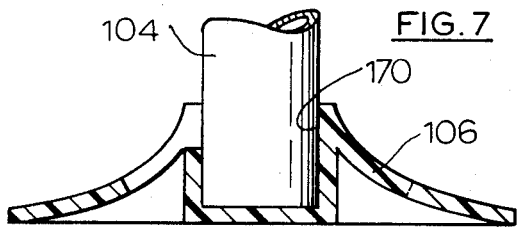
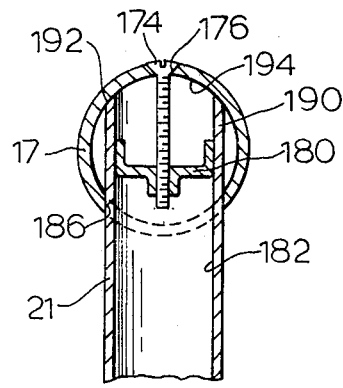
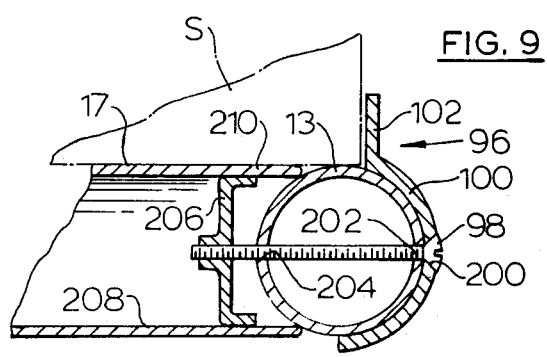
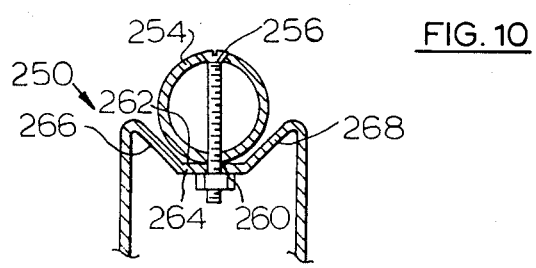

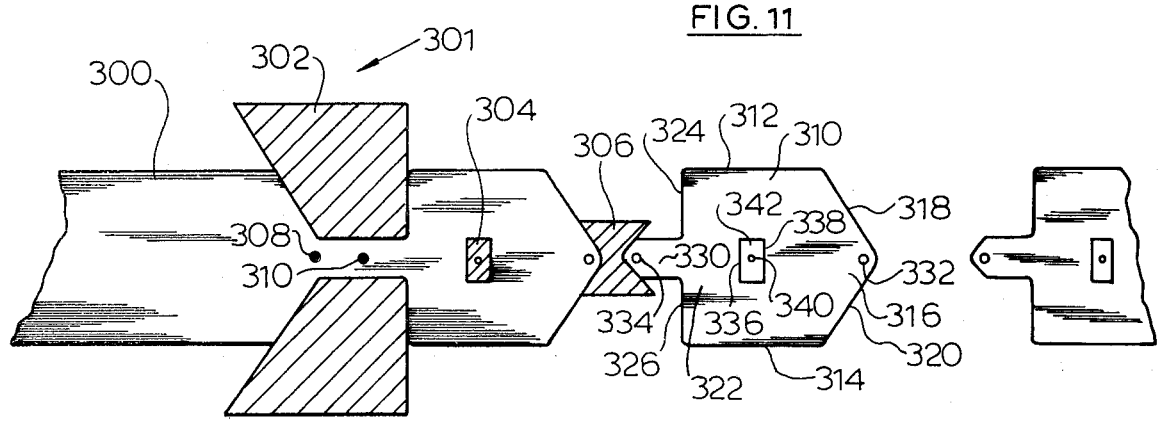
FIG. 11
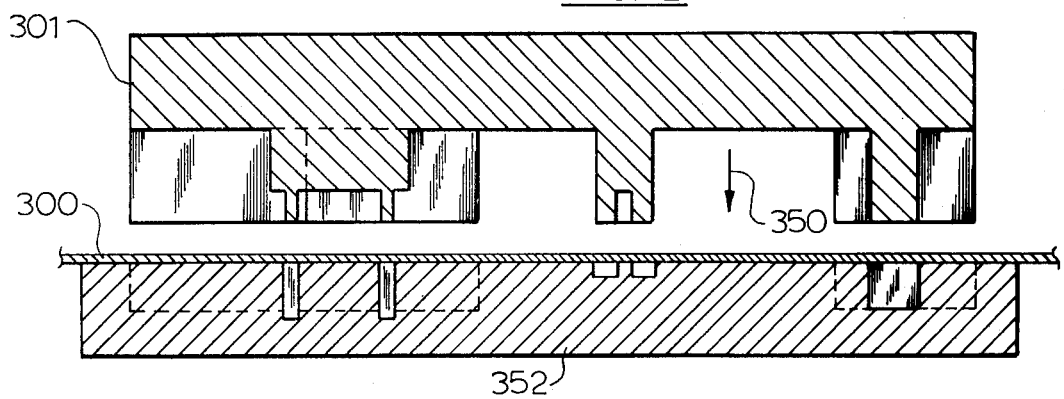
FIG. 12
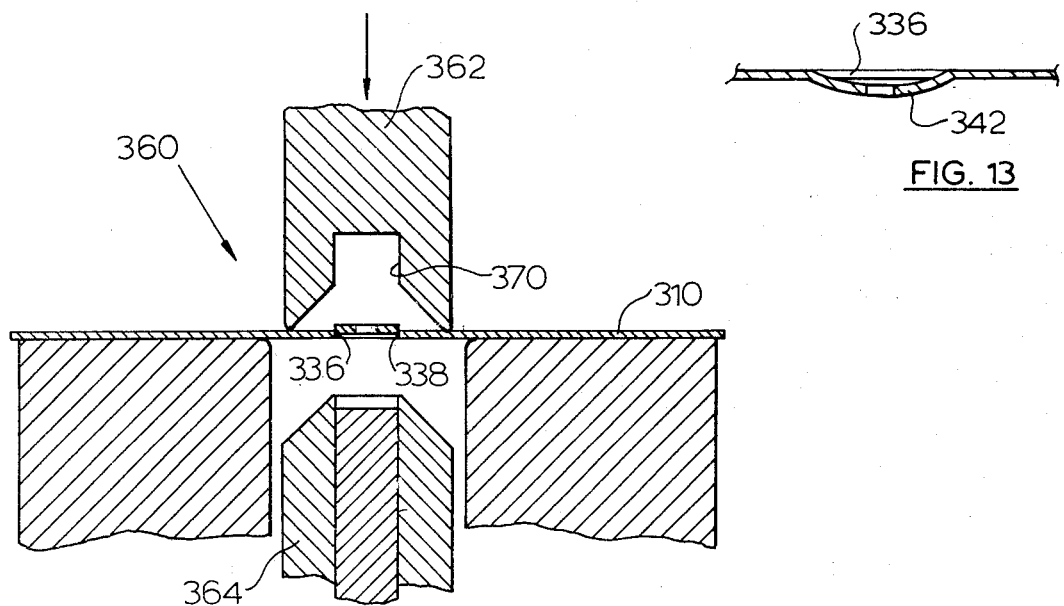
FIG. 13
FIG. 14

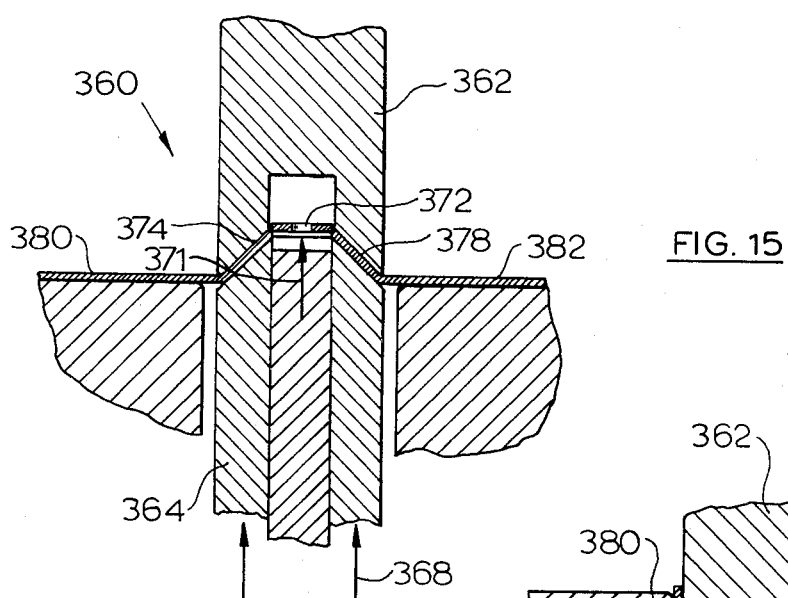
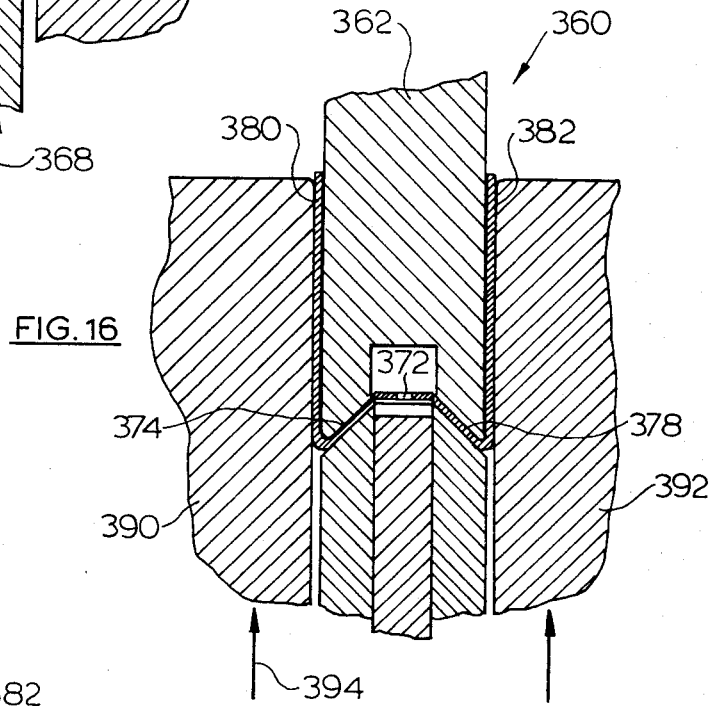
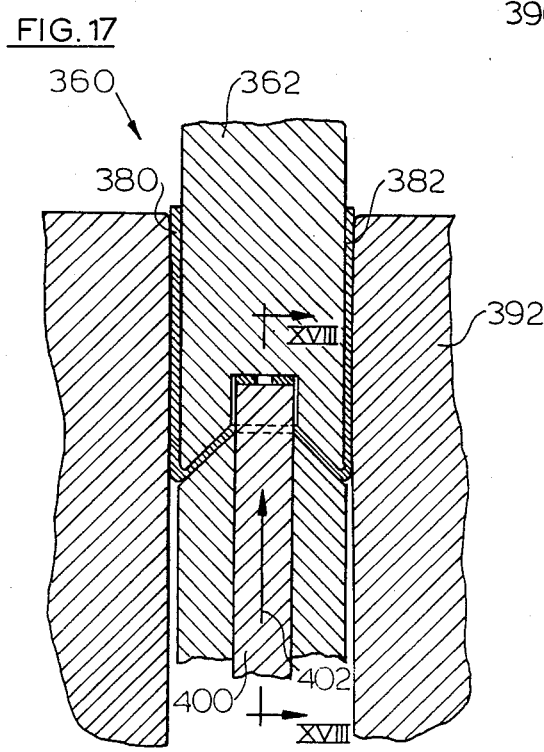
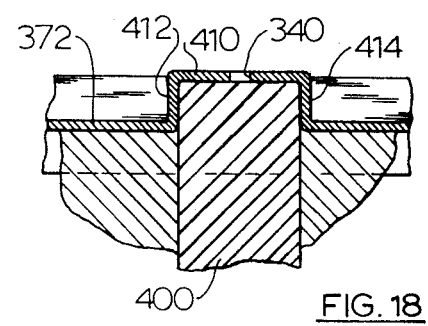

BED FRAME

BACKGROUND OF THE INVENTION

1. Field of the Invention

The invention pertains to an improved bed frame and to a bracket usable to clamp a headboard or a footboard to the frame.

2. The Prior Art

Bed frames have been made from elongated hollow tubular members. Cast aluminum clamps have been used to attach a headboard or a footboard to an associated frame.

SUMMARY OF THE INVENTION

The invention includes an improved clamp and a method of forming the clamp as well as an improved bed frame.

The improved clamp has a U-shaped, three sided, trough with a central region connected to two sidewalls. An outwardly extending three-sided tab is formed in the central member of the three-sided trough. The top and bottom members of the tab are curved with a radius of curvature that corresponds to an interior diameter of a tubular bed frame member to which the clamp is to be attached. A mounting bracket, of a selected size and shape, is attached at an outer edge of each sidewall of the trough. Each mounting bracket is oriented so as to form an acute angle with its connected respective sidewall and also so as to be substantially perpendicular to the central region of the trough.

The inventive method of forming the improved clamp element comprises the steps of: forming a blank into a selected shape, punching the blank; forming two spaced apart parallel slits in the blank at selected locations and simultaneously distorting the sheet material between the two slits so that it has a selected radius; forming two spaced apart parallel bends on the blank thereby creating a U-shaped, three-sided, trough with a central region and two sidewalls, bending back an end region of each of the two sidewalls of the trough such that the end regions are essentially perpendicular to the central region of the trough; forming the previously radiused material between the two slits into an outwardly extending three-sided tab with two outwardly curved sides joined by a planar side.

The inventive bed frame has a pair of spaced apart, elongated, tubular side members joined by a pair of laterally extending, spaced apart, tubular cross members. At each end of each of the tubular side members an inventive clamp is attached. The outwardly extending three-sided tab member, affixed to the central region of the U-shaped trough of the clamp, is slidably received within the end of the side member. The outwardly curved top and bottom members of the tab slide into the end of the tubular side member adjacent the curved interior surface thereof. A screw passes through a hole in the central part of the tab and screws into a threaded retaining member welded onto the interior surface of and near the end of the tubular side member. A bolt extends through the side members of the clamp, through the tubular side member and engages a nut to further attach the clamp to the end of the tubular side member.

Each tubular leg member of a headboard or a footboard is positioned in the vertical trough of one of the clamps. Each leg member is attached to its associated clamp by a pair of bolts. When the bolts are drawn tight, the tubular leg member of the head or footboard is distorted slightly. As a result, it contacts the trough at three regions, along each trough sidewall and along the central portion of the trough.

A plurality of tubular legs is received into a plurality of borings selectively located on the tubular, lateral, cross members. Each leg has a pair of biased top surfaces to engage an inner surface of the cross member. Each leg is rigidly attached to its associated tubular lateral cross member by a bolt. The tubular leg members of the headboard and the footboard, attached to the brackets at each end of the tubular side members of the frame, in cooperation with the elongated tubular legs, attached to the tubular lateral cross members, evenly distribute the load from the bed frame on a supporting floor.

The use of tubular side and cross members, in combination with the inventive clamps which rigidly attach the headboard and footboard to the frame, and in combination with the legs rigidly attached to the cross members, results in a strong bed frame able to support conventional spring and mattress combinations as well as newer mattresses filled with water.

The clamps, formed from sheet stock may be produced very inexpensively in production quantities.

BRIEF DESCRIPTION OF THE DRAWINGS

FIG. 1 is a perspective view of an improved bed frame incorporating the principles of the present invention;

FIG. 2 is a schematic view of an alternate bed frame incorporating the principles of the present invention;

FIG. 3 is an enlarged partial side elevation of a clamp connecting the bed frame to a headboard;

FIG. 4 is a section taken along line IV—IV of FIG. 5 showing some of the details of the connection between the bed frame and the headboard;

FIG. 5 is a section taken along line V—V of FIG. 4, showing additional details of the connection between the bed frame and the headboard;

FIG. 6 is a section taken along line VI—VI of FIG. 4 showing the three contact regions between a vertical leg member of the headboard and the clamp;

FIG. 7 is a section taken along line VII—VII of FIG. 3;

FIG. 8 is a section showing the connection between a foot member and its associated cross member;

FIG. 9 is a section taken along line IX—IX of FIG. 3 showing the details of the connection between a side member of the frame and a cross member of rht frame.

FIG. 10 is a section showing a single region of contact between a relatively small diameter vertical leg of a headboard and the clamp.

DETAILED DESCRIPTION OF THE PREFERRED EMBODIMENTS

Not by way of limitation but by way of disclosing the best mode of practicing our invention and by way of enabling one of ordinary skill to practice our invention, there are disclosed in FIGS. 1-18 various aspects of our invention.

FIG. 1 is a perspective view of an exemplary bed 5 incorporating the principles of our invention. The bed 5 comprises a headboard 7, a footboard 9 and a frame 11. A spring S and a mattress M are shown in FIG. 1 lying on the frame 11. The bed 5 is supported by a floor F.

The frame 11 has a pair of rigid, tubular, elongated side members 13, 15. The side members 13, 15 are rigidly attached to a pair of transversely extending rigid tubular cross members 17, 19. At each junction of a side member, and a cross member, such as the junction 20, is an upwardly extending tab 20a which limits transverse movement of the spring S. The frame 11 has a plurality of supporting feet 21–27 attached to the cross-members 17, 19. The exemplary feet 21–27 are each rigid tubular members. Each foot 21–27 has a molded plastic cap such as a cap 30 on the leg 25. The cap 30 protects the floor F from the leg 25 and makes moving the bed 5 easier.

The headboard 7 has a pair of upright rigid, tubular support members 32, 34 attached by a pair of clamps 36, 38 to the side members 13, 15. The footboard 9 also has a pair of upright, rigid tubular support members 42, 44 which are attached by clamps 46, 48 to the other end of the side members 13, 15. The headboard 7 and footboard 9 may also have central connections such as the section 50 which joins the vertical members 42, 44 of the footboard 9. The shape of the connecting member 50 is well known in the art and forms no part of our invention.

The frame 11 incorporating the tubular members 13–19, the plurality of feet 20–27 and the clamps 36, 38, 46, 48, in combination with the headboard 7 and footboard 9 forms a very rigid strong frame that can readily support water filled mattresses. The strength of the frame 11 derives from the use of the tubular members 13–19, the use of rigid inter-tubular member junctions, such as the junction 20, stable three region contact between each of the clamps 36, 38, 46, 48 and the respective vertical members 32, 34, 42, 44 and rigid junctions between the plurality of feet 21–29 and the cross-members 17, 19.

The frame 11 with the feet 21–27 is strong enough to support a full, queen or king size mattress M with spring S. FIG. 2 is a schematic of an alternate frame 60 suitable for a twin size mattress and spring. The frame 60 has a pair of rigid spaced apart side members 62, 64 joined by a pair of rigid tubular transverse members 66, 68. Instead of the four feet 21–27 of the frame 11 of FIG. 1, the frame 60 of FIG. 2 only has a pair of feet 70, 72. The feet 70, 72 are attached to the cross-members 66, 68 in the same way that the feet 21–27 are attached to the cross-members 17, 19. A headboard 73 with a pair of vertical support members 74, 76 is attached to the side members 62, 64 by a pair of clamps corresponding to the clamp 36. A footboard 78, also with a pair of vertical support members 80, 82, is attached by a corresponding pair of clamps. For especially light weight spring-mattress combinations, the legs 70, 72 could be removed from the frame 60.

FIG. 3, an enlarged, partial side elevation of the frame 11 shows some of the detail of the clamp 36. The clamps 38, 46 and 48 are identical to the clamp 36. A description of the clamp 36 will apply to them as well. The tubular rigid support member 32 has an external cylindrical surface 86, a portion of which, 88 is received within the clamp 36. The member 32 is affixed to the clamp 36 by a pair of screws 89, 90. The clamp 36 has a planar side piece 92 substantially of a triangular shape which is attached by a screw 94 to the tubular member 13. The side piece 92 has a pair of edges 92a, 92b joined in a semicircular region 92c. A pair of short, parallel surfaces 92d, 92e connect the edges 92a, 92b to a substantially vertical fold 92f, adjacent the region 88 of the surface 86.

A mattress retaining clip 96 is clamped between a screw 98 and the tubular side member 13 at the intersection of the side-member 13 and the cross-member 17. The clip 96 has a semi-circular, cylindrical, portion 100 with an internal radius that corresponds to the external radius of the member 13. A rectangular planar tab portion 102 extends above the member 13 and limits transverse motion of the spring S on the frame 11. A lower end 104 of the leg 21 is covered by a plastic slide 106. The slide 106 has a lower sliding surface 108 adjacent the floor F to make moving the bed 5 easier.

The tubular members each have a selected outer diameter and a selected wall thickness to maximize the strength of the frame 11. An appropriate size for each of the tubular frame members is 18 GA. gauge steel tubing with an outer diameter of 1¾" inches. An appropriate size for each of the leg members 21–27 is 20 GA. gauge steel tubing with an outer diameter of 1" inches. Each of the vertical support members 32, 34, 42, 44 may have an exterior diameter of 1½, 2 or 2½ inches. Each of the clamps 36, 38, 46, 48 is formed from 0.105" gauge brass plated steel sheet stock.

FIG. 4, a section taken substantially along line IV—IV of FIG. 5, shows further details of the clamp 36. The clamp 36 has a three-sided, substantially U-shaped, channel member 114. The member 114 receives the region 88 of the surface 86 of the tubular member 32. The member 114 has a central planar member 116 which joins a pair of side members 118, 120 at a selected anble, approximately equal to 45°. The side member 92 is folded back from the side member 120 of the U-shaped member 114 at approximately a 45° angle along the edge 92f. A second side member 122 is essentially parallel to the side member 92 but has a different shape. A pair of spaced apart side edges 122a, 122b are joined by a somewhat curved surface 122c. The edges 122a, 122b, 122c form a rigid elongated region 124 extending along the member 13. A pair of edges 122d, 122e, perpendicular to the edges 122a, 122b, a pair of edges 122f, 122g, perpendicular to the edges 122a, 122b, and a fold surface line 122g, parallel to the fold line 92f form a rectangular region 126 which joins the rearward extending region 124 to the side 118 of the U-shaped region 114.

The side members 92, 122 are parallel to each other, spaced apart and receive therebetween an end 13a of the member 13. The bolt 94 extends through a hole 127a in the triangular side member 92, through a pair of holes 127b, 127c in the end 13a of the tubular side member 13, and through a hole 172d in the elongated region 124 of the side member 122. The bolt 94 is locked by a nut 128 which is located adjacent an external surface 130 of the elongated portion 124 of the side tab 122.

FIG. 4 also shows that each of the bolts 89, 90 extends through a pair of borings 132, 132a; 134, 134a in the vertical supporting member 32 of the headboard 7. The bolts 89, 90 also extend through borings 132b and 134b in the central planar region 116 of the U-shaped concave trough 114. The screws 89, 90 are clamped by a pair of nuts 136, 138, respectively, located adjacent an external surface 140 of the central planar region 116. The inneraction of the screws 89, 90 and their associated nuts 136, 138 makes it possible to draw the tubular vertical member 32 tightly adjacent the U-shaped channel member 114 of the clamp 39. The effect of the screws 89, 90 and their associated nuts 136, 138 is to deform the member 32 slightly and insure that the member 32 is brought into contact with a region of each of the two side walls 118, 129 as well as the central planar region 116 of the U-shaped channel 114. Thus, the member 32 rigidly contacts the clamp 36 in three regions around the section 88 of the external surface 86 thereby providing a very strong rigid interconnection between the frame 11 and the vertical member 32 of the headboard 7.

The connection between each of the clamps such as the clamp 36 and the frame 11 is accomplished by rigidly attaching each of the clamps to the end of its associated side member such as end 13a of side member 13. The clamp 36 has formed in the planar central region 116 an outwardly extending, substantially U-shaped, locking tab. The tab has first and second spaced apart side members 142, 144. Each of the side walls 142, 144 has a curvature corresponding to the curvature of an interior surface 154 of the end 13a. The two walls 142, 144 are joined by a planar end member 146 which is substantially parallel to the central planar member 116. The connection element 146 is selected to have a length which permits the exterior curved surface of the curved member 142 and the exterior curved surface of the member 144 to slidably engage the interior surface 154 of the tubular member 13. A bolt 160 which extends through a boring 162 in the wall 146 engages a threaded member 164. The member 164 may be welded or affixed in any similar fashion to the interior surface 154 of the member 13.

The screw 160 draws the clamp 36 rigidly adjacent the end 13a of the member 13. The U-shaped member 142, 144, 146, which slidably engages the surface 154, increases the rigidity of the connection between the clamp 36 and the side member 13.

FIG. 6 further shows the relationship between the upper bolt 89, the trough 114 and the vertical cylindrical member 32.

FIG. 7 shows the end 104 of the rigid leg member 21 in a cylindrical boring 170 of the plastic member 106.

FIG. 8 shows the detail of the junction between the vertical foot member 21 and the lateral cross-member 17. A screw 174 extends through a boring 176 in the member 17. The screw 176 engages a locking member 180 which is welded to an interior surface 183 of the leg member 21. A hole 186 on the lower side of the member 17 has a diameter which corresponds to the outer diameter of the leg member 21. At an upper end 190 of the leg member 21, a surface 192 is formed which engages an interior surface 194 of the lateral cross-member 17. As the screw 174 is tightened in the locking member 180, the lateral cross-member 17 is drawn against the upper edge 192 of the leg 21 thereby resulting in a very rigid connection. The connections between the leg members 23–27 and the associated lateral cross-members 17, 19 are identical to the connection between the cross-member 17 and the leg member 21.

FIG. 9 shows the detail of the connection between each of the side-members, such as the side member 13 and each of the lateral cross-members, such as the cross-member 17. The bolt 98 extends through a boring 200 in the clip 96, a boring 202 and a boring 204 in the side-member 13. The bolt 98 then engages a threaded member 206 welded to an interior surface 208 of the lateral cross-member 17. The tubular side-member 13 may thus be drawn rigidly against an end 210 of the member 17.

FIG. 10 represents an alternate embodiment of our invention with a bracket 250 that has the same configuration as the bracket 36 clamped to a vertical bed post member 254 by a screw 256. The vertical bed post member 254 of FIG. 10 is of a smaller diameter than the vertical bed post member 32 previously discussed which was clamped to the clamp 36. The vertical bed post member 254 has only a single region 260 of the bed post 254 adjacent a region 262 on the central member 264 of the clamp 250. In this embodiment, the post 254 is not drawn against the side members 266 and 268 of the clamp 250.

As a further alternate, a vertical bed post member might have a larger diameter than the diameter of the member 32. In this embodiment, the larger diameter of the vertical bed post member would result in that member only contacting a clamp, such as the clamp 250, on the side members such as the side members 266, 268 of the U-shaped channel of the clamp.

FIGS. 11 through 18 disclose a method of forming the inventive sheet form clamp 36. With respect to FIG. 11, a strip 300 of sheet metal of a selected gauge and width is fed from a roll into a multi-part cutting and forming die having parts 302, 304, 306 and punches 308, 310. With each cutting and punching operation of the multi-part die 301, a planar sheet form member 310 is formed. The member 310 has a pair of parallel spaced apart sides 312, 315 joined at an end 316 by a pair of biased edges 318, 320. At an end 322, the edges 312, 314 are joined by a pair of perpendicular edges 324, 326, and joined by a rectangular tab member 330. The planar sheet form member 310 has a pair of holes 332, 334 punched therein. Additionally, two slits 336, 338 are formed in a central region of the member 310 with a hole 340 located therebetween. During the slicing operation which forms the slits 336, 338 the metal region 342 located between the slits is deflected downwardly and given a selected radius. All of the above identified cutting operations are essentially performed simultaneously by the die 301.

FIG. 12 is a side view showing the upper part of the die 301 ready to move downwardly in a direction 350 toward a lower part of the die 352 to form the planar sheet form member 310 of FIG. 11.

FIG. 13 is a side view, partially in section, of the sheet form member 310 showing the deflected metal region 342 between the slits 336, 338.

FIG. 14 shows a multi-part metal forming tool 360 which is used to form the final shape of the sheet form member 310. The member 310 is located laterally with respect to an upper region 362 and a lower region 364 of the tool 360. The slits 336, 338 are centered with respect to a concave region 370 of the upper member 362 of the die 360.

As shown in FIG. 15, the next step in forming the completed bracket is to move the lower member 364 of the tool 360 upwardly, in a direction 368 thus deflecting and bending a central region of the sheet member 310 into an essentially U-shaped channel having a planar rear region 372 connected to a pair of 45° side members 374, 378. The members 374, 378 are in turn connected to a pair of as yet undeflected tab members 380, 382.

FIG. 16 shows the tab members 380, 382 being wiped backward with respect to the two side members 374, 378 of the generally U-shaped channel region now formed in the blank 310. The wiping operation is a result of a pair of members 390, 392 of the tool 360 moving upwardly in a direction 394 hence folding back the tab members 380, 382 along the tool 362.

FIG. 17 shows the final step of the method wherein another centrally located member 400 forms the U-shaped and outwardly extending tab portion in the central planar region 372. The member 400 moves upwardly in a direction 402 further deflecting the sheet material 342 which previously had been deflected to have a selected radius between the slits 336, 338. A rear surface 410 is now formed essentially parallel to an undeflected portion of the central member 372 of the U-shaped channel. The member 410 is joined to the region 372 by a pair of curved sides 412, 414.

FIG. 18, a section taken along line 18—18 of FIG. 17 shows the rear planar portion 410 joined by the two curved sides 412, 414 to the central region 372 of the generally U-shaped channel 371. As may be seen in FIG. 18, the die member 400 has driven the metal region 342 between the slits 336, 338 which previously had been given a selected radius, see FIG. 13, into an extended three-sided, U-shaped tab.

While various modifications and changes might be suggested by those skilled in the art, it will be understood that we wish to include within the claims of the patent warranted hereon all such modifications and changes as reasonably come within our contribution to the art.

We claim as our invention:

1. A mounting clamp to attach a cylindrical vertical supporting leg of a headboard or a footboard to an end of a tubular bed frame member comprising:
   a pair of shaped, rigid, spaced apart, side members, each said spaced apart side member is joined, along a first elongated side, to a substantially concave, elongated, rigid, three sided sheet member;
   a first U-shaped bracket with a central region adapted to slide within the end of the tubular bed frame member and curved side members adapted to simultaneously contact opposite interior curved regions thereof, said first bracket is fixedly attached to a central region of said concave three-sided member, a hole in said central region of said first U-shaped bracket;
   a second U-shaped bracket adapted to fit within and be fixedly attached to first and second interior regions of the tubular bed frame member adjacent the end thereof, said bracket has a threaded hole centrally located therein;
   a threaded means for removably connecting, said threaded means has a threaded end that is adapted to pass through said hole in said first U-shaped bracket and engage said threaded hole in said second U-shaped bracket thereby drawing said first U-shaped bracket into the end of the tubular bed frame member until selected regions of the end of the tubular member are tightly forced against selected regions of said central portion of said concave three-sided member thereby forming a rigid connection between said clamp and the tubular bed frame member;
   said concave member when oriented substantially vertically is adapted to receive the cylindrical, vertical, supporting leg of the headboard or footboard;
   means for retaining to retain the vertical support leg within said concave, elongated sheet member and to distort the vertical support leg slightly so that at least three selected regions of the cylindrical support leg contact corresponding regions on said concave, elongated, rigid, sheet member.

2. An improved tubular bed frame with two axially extending spaced apart tubular members and at least two transversely extending tubular members attached thereto along with a headboard and a footboard, the improvement comprising:
   a plurality of rigid, elongated, tubular feet, each of a selected length, and a first end with a beveled surface adapted to be received within a selectively located boring in a selected one of the transverse members with each said beveled surface in contact with an interior region of the transverse member;
   means for retaining, rigidly locking each of said feet to the respectively transversely extending member;
   a plurality of sheet-form means for clamping, each of said sheet-form means for clamping has a U-shaped bracket, with curved side members, that is slidable within an end of a respective axially extending tubular member with said curved side members in sliding contact with selected interior regions at the end of the tubular means and is removably attachable to the respective end of each of the axially extending tubular members;
   each of said sheet-form means for clamping is adapted to receive a cylindrical foot member of the headboard or the footboard;
   means for affixing adapted to rigidly clamp each respective one of the foot members of the headboard or footboard to a respective one of said sheet-form means for clamping simultaneously while slightly deforming the respective foot member so that it contacts three spaced apart regions on said sheet-form means for clamping;
   the clamped foot members of the headboard and footboard cooperate with said tubular feet to distribute the weight of the bed frame over a substantial area of the supporting floor.

* * * * *